US011216757B2

(12) United States Patent
Shiraishi (10) Patent No.: US 11,216,757 B2
(45) Date of Patent: Jan. 4, 2022

(54) WORKER MANAGEMENT DEVICE (71) Applicant: FANUC CORPORATION, Yamanashi (JP)

(72) Inventor: Wataru Shiraishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 286 days.

(21) Appl. No.: 16/202,089

(22) Filed: Nov. 28, 2018

(65) Prior Publication Data

US 2019/0164110 A1    May 30, 2019

(30) Foreign Application Priority Data

Nov. 29, 2017 (JP) .............................. JP2017-228573

(51) Int. Cl.
| | |
|---|---|
| *G06Q 10/00* | (2012.01) |
| *G06N 3/00* | (2006.01) |
| *G06N 5/00* | (2006.01) |
| *G06N 20/00* | (2019.01) |
| *G06Q 10/06* | (2012.01) |
| *G06N 3/08* | (2006.01) |
| *G06N 5/04* | (2006.01) |
| *G06N 3/04* | (2006.01) |

(52) U.S. Cl.
CPC ... *G06Q 10/063114* (2013.01); *G06N 3/0454* (2013.01); *G06N 3/088* (2013.01); *G06N 5/04* (2013.01); *G06N 20/00* (2019.01)

(58) Field of Classification Search
CPC ........ G06Q 10/00–50/00; G06N 20/00; G06N 3/00; G06N 5/00

USPC ............................................... 705/7.11–7.42
See application file for complete search history.

(56) References Cited

U.S. PATENT DOCUMENTS

| | | | |
|---|---|---|---|
| 7,957,565 B1 * | 6/2011 | Sharma | .............. G06K 9/00778 |
| | | | 382/115 |
| 9,489,579 B2 | 11/2016 | Matsunaga | |
| (Continued) | | | |

FOREIGN PATENT DOCUMENTS

| | | |
|---|---|---|
| CN | 106447184 A | 2/2017 |
| JP | 2008-146301 A | 6/2008 |
| (Continued) | | |

OTHER PUBLICATIONS

Seo, J., Han, S., Lee, S., & Kim, H. (2015). Computer vision techniques for construction safety and health monitoring. Advanced Engineering Informatics, 29(2), 239-251. (Year: 2015).*

(Continued)

*Primary Examiner* — Alan S Miller
*Assistant Examiner* — Mustafa Iqbal
(74) *Attorney, Agent, or Firm* — Hauptman Ham, LLP (57) ABSTRACT

A machine learning device provided in a worker management device observes, as state variables representing a current state of an environment, worker external state data indicating an external state of a worker and manufacturing machine state data indicating a state of a manufacturing machine, and acquires, as label data, worker status data indicating a status of the worker. The machine learning device then learns the worker external state data and the manufacturing machine state data in association with the worker status data by performing supervised learning using the observed state variables and the acquired label data.

17 Claims, 6 Drawing Sheets

(56) References Cited

U.S. PATENT DOCUMENTS

| | | |
|---|---|---|
| 2011/0128363 A1 | 6/2011 | Mizutani |
| 2013/0184997 A1* | 7/2013 | Mott .................... A61B 5/0205 |
| | | 702/19 |
| 2013/0282609 A1* | 10/2013 | Au .......................... F16P 3/142 |
| | | 705/325 |
| 2015/0131856 A1 | 5/2015 | Matsunaga |
| 2016/0253618 A1 | 9/2016 | Imazawa et al. |
| 2017/0028553 A1 | 2/2017 | Tsuda et al. |
| 2017/0178490 A1* | 6/2017 | Kozloski ................ G08B 31/00 |
| 2017/0185944 A1 | 6/2017 | Volkov et al. |
| 2017/0308049 A1 | 10/2017 | Fujii et al. |
| 2020/0104779 A1* | 4/2020 | Li .................... G06Q 10/06398 |

FOREIGN PATENT DOCUMENTS

| | | |
|---|---|---|
| JP | 2015-95209 A | 5/2015 |
| WO | 2010/143361 A1 | 12/2010 |

OTHER PUBLICATIONS

Office Action in DE application No. 102018129529.4, dated Jul. 28, 2020, 11pp.

Office Action in JP Application No. 2017-228573, dated Jul. 9, 2019, 3pp.

Office Action in CN application No. 201811445136.8, dated May 22, 2020, 40pp.

* cited by examiner

WORKER MANAGEMENT DEVICE

RELATED APPLICATIONS

The present application claims priority of Japanese Patent Application No. 2017-228573, filed on Nov. 29, 2017, the disclosure of which is hereby incorporated by reference herein in its entirety.

BACKGROUND OF THE INVENTION

1. Field of the Invention

The present invention relates to a worker management device, and more particularly to a worker management device that automatically detects statuses such as work situations and skill levels of workers, whereby measures such as securing the safety of the workers, evaluating the performances and improving the skills of the workers, and analyzing the operation ratio of a factory can be realized easily.

2. Description of the Related Art

A manager who manages workers working on site is present in a factory. The manager monitors the workers to ensure that the workers are working efficiently, the workers sufficiently understand the content of the work before proceeding with the work, the workers are working sufficiently carefully during dangerous work, and so on. The manager also offers guidance to the workers when a problem arises, adjusts the placement of the workers on the site, issues the workers to take training and rest, and so on.

An injection molding factory will be described as an example. An injection molding system is constituted by an injection molding machine, a mold, a mold temperature controller, a molding material drier, a molded article takeout machine (a robot), an insert article insertion robot, a molded article inspection device, a conveyor, a molding article packing device, a monitoring camera for checking the surface of the mold for foreign matter, a personal computer for managing molding data, and so on. The workers in the factory perform maintenance on these components, and in particular, periodic maintenance of screw cylinders installed in the mold and the injection molding machine is essential to remove gas, pitch, carbides, and so on that adhere to the screw cylinders and accumulate thereon due to the deterioration of high-temperature resin. However, the mold and the screw cylinders are controlled to high temperatures and assembled using metal components having complicated shapes, and therefore maintenance thereof is dangerous. Hence, as a protective measure for reducing the risk, the workers undertake the maintenance work while wearing various types of safety equipment, clothing, and so on to ensure safety. Typically, equipment such as a protective cap, work clothes, gloves, and safety boots are required, and depending on the content of the maintenance work, measures such as tying up long hair, removing necklaces, neckties, and so on, wearing safety glasses or goggles, and wearing heat-resistance gloves or the like may also be required. The manager checks the workers and provides guidance to the workers where necessary to ensure that the workers do not start the work without complying with the safety measures.

The work of a site manager in a factory is therefore important, and yet it is extremely difficult for a small number of managers to check and manage the situations of all of the workers working on the site. Hence, as a conventional technique for automating checks on the situations of workers, Japanese Patent Application Laid-Open No. 2008-146301, for example, discloses a technique for notifying a worker of a protective equipment wearing state, i.e. whether or not the worker is wearing predetermined protective equipment on a work site, by automatically detecting an ID-TAG attached to the protection equipment when the worker enters the work site.

Further, Japanese Patent Application Laid-Open No. 2015-95209 discloses a monitoring technique for determining whether or not a subject is in an appropriate state corresponding to the content of work by detecting a predetermined site on the body of the subject from an image, and a technique for estimating a work environment or the content of the work by recognizing objects worn in sites other than the predetermined site or peripheral objects.

Workers perform work on a work site in various situations, and the content of the check to be performed by the manager differs according to the situation in which the work is performed (the worker status). With the technique described in Japanese Patent Application Laid-Open No. 2008-146301, it is possible to check whether or not the worker is wearing the protective equipment when the worker enters the site, but it is not possible to manage a single worker on a single work site while distinguishing between a situation in which the protective equipment is necessary and a situation in which the protective equipment is not necessary.

Further, with the technique described in Japanese Patent Application Laid-Open No. 2015-95209, it is difficult to distinguish cases that appear the same but differ in terms of work content from the image. For example, it may be difficult to distinguish between a case in which a worker temporarily stops a normal operation and approaches a tool or a workpiece in order to check the workpiece or the like visually and so on, and a case in which an abnormality occurs and the worker approaches the tool or the workpiece to perform an adjustment or maintenance thereon. Furthermore, in many factories, maintenance tools are provided around machines at all times, and it may therefore be difficult to estimate the work content from the peripheral objects. In this case, a warning or a report to the manager may be issued erroneously when a worker who is not performing maintenance work approaches a tool or a workpiece.

Moreover, as described above, management of workers by a site manager involves a wide range of tasks, such as determining from the work situations of the workers whether or not to rearrange the placement of the workers, whether or not the workers require training or rest, and so on. However, a method for evaluating the performances of the workers and quantifying statuses such as the current work situations and skill levels of the workers has not yet been established, and it is therefore impossible to quantify these elements and use the resulting values during worker management, factory management, and so on.

SUMMARY OF THE INVENTION

Therefore, an object of the present invention is to provide a worker management device and a machine learning device that automatically detect statuses such as work situations and skill levels of workers, whereby measures such as securing the safety of the workers and evaluating the performances and improving the skills of the workers can be realized easily.

According to the present invention, the problems described above are solved by learning physical quantities (process monitoring data, an operation history, an alarm history, a molding condition modification history, and so on) relating to worker image data and a molding system through machine learning, automatically detecting statuses of workers, and managing the detected statuses.

A worker management device according to an aspect of the present invention manages a worker performing work on a manufacturing machine in a factory, and includes a machine learning device that learns an estimate of a status of the worker in relation to an external state of the worker and a state of the manufacturing machine. The machine learning device includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a label data acquisition unit that acquires, as label data, worker status data indicating the status of the worker; and a learning unit that learns the worker external state data and the manufacturing machine state data in association with the worker status data by supervised learning using the state variables and the label data.

The learning unit may include an error calculation unit that calculates an error between a correlation model used to estimate a current status of the worker from the state variables and a correlation feature identified from teacher data prepared in advance, and a model updating unit that updates the correlation model so as to reduce the error.

The learning unit may calculate the state variables and the label data in a multilayer structure.

A worker management device according to another aspect of the present invention manages a worker performing work on a manufacturing machine in a factory, and includes a machine learning device that has learned an estimate of a status of the worker in relation to an external state of the worker and a state of the manufacturing machine. The machine learning device includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a learning unit that has learned, through supervised learning, the external state of the worker and the state of the manufacturing machine in association with the status of the worker; and an estimation result output unit that outputs the status of the worker on the basis of the state variables observed by the state observation unit and a learning result acquired by the learning unit.

A worker management device according to a further aspect of the present invention manages a worker performing work on a manufacturing machine in a factory, and includes a machine learning device that learns an estimate of a status of the worker in relation to an external state of the worker and a state of the manufacturing machine. The machine learning device includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; and a learning unit that learns the status of the worker by unsupervised learning using the state variables.

A worker management device according to a further aspect of the present invention manages a worker performing work on a manufacturing machine in a factory, and includes a machine learning device that has learned an estimate of a status of the worker in relation to an external state of the worker and a state of the manufacturing machine. The machine learning device includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a learning unit that has learned, through unsupervised learning, the status of the worker based on the external state of the worker and the state of the manufacturing machine; and an estimation result output unit that outputs the status of the worker on the basis of the state variables observed by the state observation unit and a learning result acquired by the learning unit.

A worker management device according to a further aspect of the present invention manages a worker performing work on a manufacturing machine in a factory, and includes a machine learning device that learns an estimate of a status of the worker in relation to an external state of the worker and a state of the manufacturing machine. The machine learning device includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a label data acquisition unit that acquires, as label data, worker status data indicating the status of the worker; a first learning unit that learns the worker external state data and the manufacturing machine state data in association with the worker status data by supervised learning using the state variables and the label data; and a second learning unit that learns the status of the worker by unsupervised learning using the state variables.

A worker management device according to a further aspect of the present invention manages a worker performing work on a manufacturing machine in a factory, and includes a machine learning device that has learned an estimate of a status of the worker in relation to an external state of the worker and a state of the manufacturing machine. The machine learning device includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a first learning unit that has learned, through supervised learning, the external state of the worker and the state of the manufacturing machine in association with the status of the worker; a second learning unit that has learned, through unsupervised learning, the status of the worker based on the external state of the worker and the state of the manufacturing machine; and an estimation result output unit that outputs the status of the worker on the basis of the state variables observed by the state observation unit, a learning result acquired by the first learning unit, and a learning result acquired by the second learning unit.

A machine learning device according to an aspect of the present invention learns an estimate of a status of a worker performing work on a manufacturing machine in a factory in relation to an external state of the worker and a state of the manufacturing machine, and includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a label data acquisition unit that acquires, as label data, worker status data indicating the status of the worker; and a learning unit that learns the worker external state data and the manufacturing machine state data in association with the worker status data by supervised learning using the state variables and the label data.

A machine learning device according to another aspect of the present invention has learned an estimate of a status of a worker performing work on a manufacturing machine in a factory in relation to an external state of the worker and a state of the manufacturing machine, and includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a learning unit that has learned, through supervised learning, the external state of the worker and the state of the manufacturing machine in association with the status of the worker; and an estimation result output unit that outputs the status of the worker on the basis of the state variables observed by the state observation unit and a learning result acquired by the learning unit.

A machine learning device according to a further aspect of the present invention learns an estimate of a status of a worker performing work on a manufacturing machine in a factory in relation to an external state of the worker and a state of the manufacturing machine, and includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; and a learning unit that learns the status of the worker by unsupervised learning using the state variables.

A machine learning device according to a further aspect of the present invention has learned an estimate of a status of a worker performing work on a manufacturing machine in a factory in relation to an external state of the worker and a state of the manufacturing machine, and includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a learning unit that has learned, through unsupervised learning, the status of the worker based on the external state of the worker and the state of the manufacturing machine; and an estimation result output unit that outputs the status of the worker on the basis of the state variables observed by the state observation unit and a learning result acquired by the learning unit.

A machine learning device according to a further aspect of the present invention learns an estimate of a status of a worker performing work on a manufacturing machine in a factory in relation to an external state of the worker and a state of the manufacturing machine, and includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a label data acquisition unit that acquires, as label data, worker status data indicating the status of the worker; a first learning unit that learns the worker external state data and the manufacturing machine state data in association with the worker status data by supervised learning using the state variables and the label data; and a second learning unit that learns the status of the worker by unsupervised learning using the state variables.

A machine learning device according to a further aspect of the present invention has learned an estimate of a status of a worker performing work on a manufacturing machine in a factory in relation to an external state of the worker and a state of the manufacturing machine, and includes: a state observation unit that observes, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively; a first learning unit that has learned, through supervised learning, the external state of the worker and the state of the manufacturing machine in association with the status of the worker; a second learning unit that has learned, through unsupervised learning, the status of the worker based on the external state of the worker and the state of the manufacturing machine; and an estimation result output unit that outputs the status of the worker on the basis of the state variables observed by the state observation unit, a learning result acquired by the first learning unit, and a learning result acquired by the second learning unit.

According to the present invention, worker safety can be secured and worker statuses can be managed easily, enabling an improvement in the operation ratio of a factory.

DETAILED DESCRIPTION OF THE PREFERRED EMBODIMENTS

Figure 1:
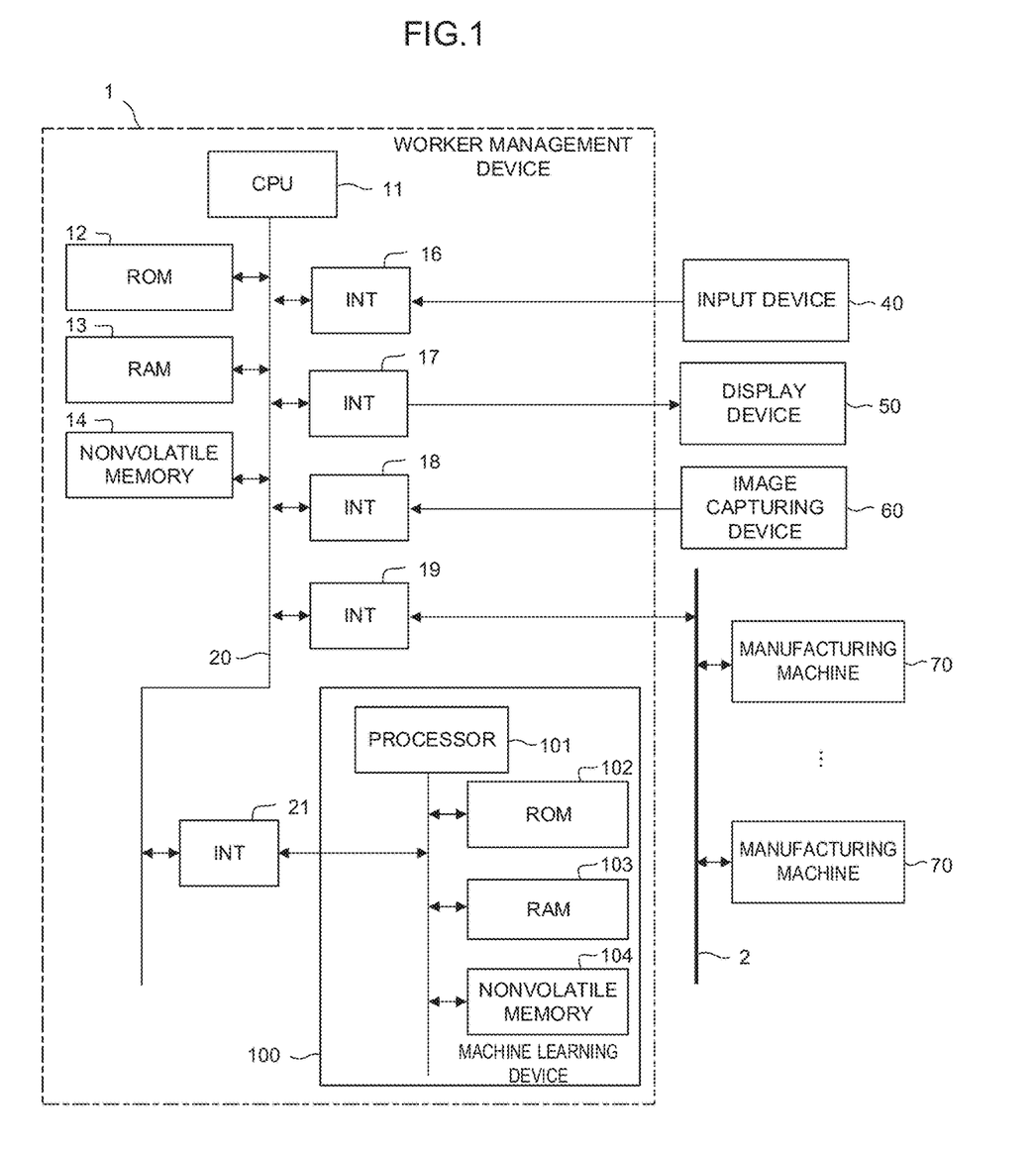
FIG. 1 is a schematic view showing a hardware configuration of a worker management device according to a first embodiment.

FIG. 1 is a schematic view showing a hardware configuration of main parts of a worker management device according to a first embodiment.

A worker management device 1 can be embodied as a controller for controlling a manufacturing machine 70 installed in a factory or a personal computer annexed to the manufacturing machine 70, for example. The worker management device 1 can also be embodied as a computer such as a cell computer, a host computer, or a cloud server connected to the manufacturing machine 70 installed in the factory via a network 2. Note that the manufacturing machine 70 is a machine installed in a factory to perform a manufacturing process, and in an injection molding factory, for example, the manufacturing machine 70 may be an injection molding machine, a mold temperature controller, a molding material drier, a molded article takeout machine (a robot), an insert article insertion robot, a molded article inspection device, a conveyor, a molding article packing device, and so on.

A CPU 11 provided in the worker management device 1 according to this embodiment serves as a processor for executing overall control of the worker management device 1. The CPU 11 reads a system program stored in a ROM 12 via a bus 20 and executes overall control of the worker management device 1 in accordance with the system program. A RAM 13 temporarily stores temporary calculation data, various data input by an operator via an input unit, not shown in the figure, and so on.

A nonvolatile memory 14 is backed up by a battery, not shown in the figure, or the like, for example, so that a storage state thereof is maintained even after a power supply of the worker management device 1 is switched OFF. The nonvolatile memory 14 stores various data input by an operator by operating an input device 40, data (for example, images such as static images and moving images showing work situations of workers, times at which the images were captured, and so on) acquired from an image capturing device 60, data (information indicating an operating state of the manufacturing machine 70; when the manufacturing machine 70 is an injection molding machine, for example, molding conditions, physical quantity data relating to injection molding, a worker operation history, a molding condition modification history, an alarm history, molded article inspection data, physical quantity data relating to peripheral devices, and so on) acquired from the manufacturing machine 70 via an interface 19, a control program input via an interface, not shown in the figure, and so on. The program and various data stored in the nonvolatile memory 14 may be expanded to the RAM 13 when executed/used. Further, system programs including a well-known analysis program for analyzing the information acquired from the image capturing device 60 and the manufacturing machine 70, a system program for controlling communication with a machine learning device 100, to be described below, and so on are written in advance to the ROM 12.

The image capturing device 60 is mainly used to capture images of the work situations of workers. A camera or the like mounted on a robot, the ceiling of a factory, or the like in order to capture static images or moving images may be used as the image capturing device 60. The work situations of the workers, captured by the image capturing device 60, are stored in the RAM 13 or the nonvolatile memory 14 via an interface 18, analyzed by a well-known analysis program or the like, and then used.

An interface 21 is used to connect the worker management device 1 to the machine learning device 100. The machine learning device 100 includes a processor 101 for executing overall control of the machine learning device 100, a ROM 102 storing a system program and so on, a RAM 103 for performing temporary storage during various processing relating to machine learning, and a nonvolatile memory 104 used to store a learning model and so on. The machine learning device 100 is capable of observing information (the static and moving images showing the work situations of the workers, status information indicating the work situations of the workers, which is acquired by analyzing the static and moving images, information indicating the operating state of the manufacturing machine 70, and so on) that can be acquired by the worker management device 1 via the interface 21. Further, the worker management device 1 displays management information output from the machine learning device 100 on a display device 50 via an interface 17.

Figure 2:
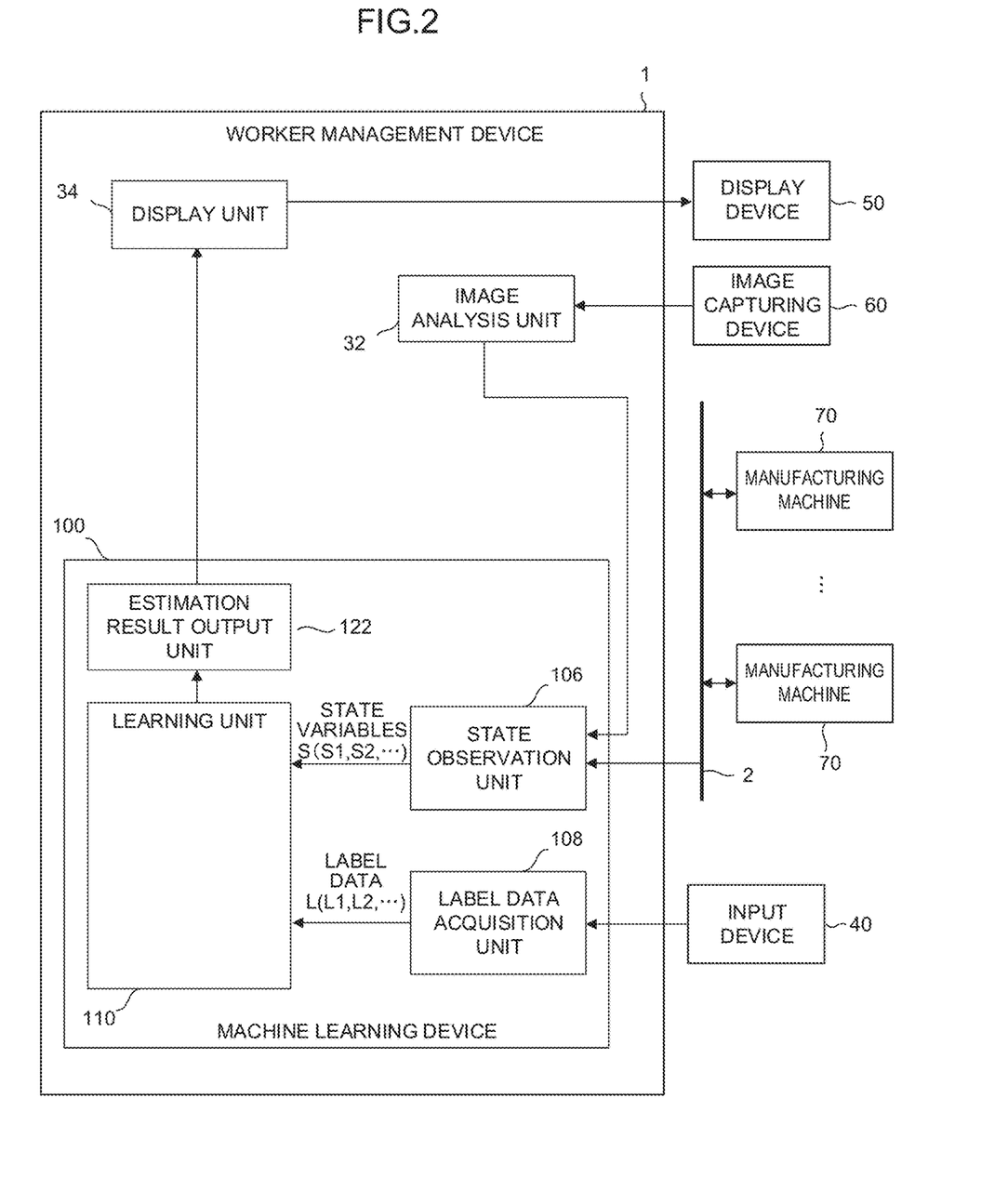
FIG. 2 is a schematic function block diagram of the worker management device according to the first embodiment.

FIG. 2 is a schematic function block diagram of the worker management device 1 and the machine learning device 100 according to the first embodiment of the present invention.

Respective function blocks shown in FIG. 2 are realized by having the CPU 11 of the worker management device 1 and the processor 101 of the machine learning device 100, as shown in FIG. 1, respectively execute system programs in order to control operations of the respective parts of the worker management device 1 and the machine learning device 100.

The worker management device 1 according to this embodiment includes an image analysis unit 32 for analyzing images acquired from the image capturing device 60 and generating data to be used during learning by the machine learning device 100, and a display unit 34 for displaying instructions output from the machine learning device 100 to the workers on the display device 50.

The image analysis unit 32 generates data to be used during learning by the machine learning device 100 on the basis of data relating to an image that is acquired from the image capturing device 60, stored in the nonvolatile memory 14, and shows the work situation of a worker. For example, the image analysis unit 32 analyzes the equipment wearing condition of the worker (for example, whether the worker is wearing a safety cap, gloves, safety glasses, and so on), the actions of the worker (for example, the manufacturing machine 70 near which the worker is working, the manner in which the worker is acting, the manner in which the hands of the worker are outstretched, and so on), the state of the manufacturing machine 70 in the vicinity of the worker (for example, the illumination condition of a lamp on a manufacturing machine 70 in the vicinity of the worker, the states of movable parts, and so on), the time at which the image was captured, and so on, and outputs these data to the machine learning device 100.

A well-known, conventional method may be used as the image analysis method employed by the image analysis unit 32. For example, regarding the equipment wearing condition, a method of identifying the body of the worker from an image and either determining whether or not the worker is wearing the equipment by identifying the colors of parts such as the head, hands, and eyes of the worker or affixing identification marks to the equipment and determining whether or not the worker is wearing the equipment by detecting the marks may be employed. Further, regarding the actions of the worker, for example, a method of identifying the body of the worker from a moving image and identifying the actions of the worker by analyzing the movements thereof may be employed. A data set created in this manner is used by the machine learning device 100 for learning and estimation.

The display unit 34 displays estimation results relating to worker statuses output from the machine learning device 100 on the display device 50. The display unit 34 may also display warnings, advice, instructions, and so on included in the worker statuses output from the machine learning device 100 while sounding an alarm or the like in order to notify the workers thereof. The display unit 34 may also display the worker statuses output from the machine learning device 100 on the display device 50 indifferent text colors and background colors and with different status titles depending on the type of the worker status. Furthermore, the display unit 34 may output the worker statuses output from the machine learning device 100 to the manufacturing machine 70.

Meanwhile, the machine learning device 100 provided in the worker management device 1 includes software (a learning algorithm and so on) and hardware (the processor 101 and so on) for self-learning, through so-called machine learning, an estimate of the worker status of each worker in relation to the external state of the worker and the state of the manufacturing machine. The items learned by the machine learning device 100 correspond to a model structure expressing a correlation between the worker status of the worker on the one hand and the external state of the worker and the state of the manufacturing machine on the other.

As illustrated by the function blocks shown in FIG. 2, the machine learning device 100 of the worker management device 1 includes a state observation unit 106 that observes, as state variables S representing the current state of an environment, worker external state data S1 indicating the external state of the worker and manufacturing machine state data S2 indicating the state of the manufacturing machine, a label data acquisition unit 108 for acquiring label data L including worker status data L1 indicating the current status of the worker, a learning unit 110 that uses the state variables S and the label data L to learn the current status of the worker in association with the external state of the worker and the state of the manufacturing machine, and an estimation result output unit 122 that outputs the current status of the worker, estimated from the external state of the worker and the state of the manufacturing machine using a learned model learned by the learning unit 110.

The state observation unit 106 acquires the worker external state data S1 and manufacturing machine state data S2, as state variables S, from the image analysis unit 32 and the manufacturing machine 70 during learning by the learning unit 110. Further, the state observation unit 106 acquires the worker external state data S1 and manufacturing machine state data S2, as state variables S, from the image analysis unit 32 and the manufacturing machine 70 during estimation of the worker status of the worker using the learning result of the learning unit 110.

Of the state variables S observed by the state observation unit 106, the worker external state data S1 can be acquired as a set of data indicating states of the worker that can be specified by external observation, for example. Examples of data indicating states of the worker that can be specified by external observation include data indicating the equipment wearing state of the worker, data indicating the position of the worker (the manufacturing machine 70 near which the worker is working and so on), data indicating external actions by the worker (the manner in which the worker is acting, the manner in which the hands of the worker are outstretched, positional relationships of the hands, head, and torso relative to the manufacturing machine 70, the length of time the hands, head, and torso are held still, and so on), the operating history of the worker in relation to the manufacturing machine 70, the time of the observation, and so on. Any data that are useful for specifying the work being performed by the worker through external observation may be employed as the worker external state data S1. The data included in the worker external state data S1, indicating the state of the worker, may be constituted by either single numerical values or series of values obtained by sampling values that vary over a predetermined period of time at predetermined period intervals, for example.

The manufacturing machine state data S2 of the state variables S can be acquired from each manufacturing machine 70 as a set of data indicating the state of the manufacturing machine 70. The manufacturing machine state data S2 include, for example, data indicating the operating state of the manufacturing machine 70, data indicating the current state of a movable part of the manufacturing machine 70 (whether a mold is open or the like), machining conditions set in the manufacturing machine 70 and modification histories thereof, data indicating physical quantities of an operation performed by the manufacturing machine 70, an alarm history, product inspection data, the observation time, and so on. Any data relating to the state of the manufacturing machine 70 may be employed as the manufacturing machine state data S2. The data included in the manufacturing machine state data S2, indicating the state of the manufacturing machine 70, may be constituted by either single numerical values or series of values obtained by sampling values that vary over a predetermined period of time at predetermined period intervals, for example.

During learning by the learning unit 110, the label data acquisition unit 108 acquires worker status data L1 indicating the current status of the worker, as the label data L, on the basis of input by a manager or the like into the input device 40. The worker status data L1 are data indicating the content of work currently being performed by the worker, and current statuses of a worker in an injection molding factory, for example, include "Purging", "Screw maintenance", "Replacing mold", "mold maintenance", "Supplying material", and so on. The worker status data L1 may also include information relating to cautions and warnings issued to the worker. Cautions and warnings issued to a worker in an injection molding factory, for example, include "Screw maintenance (Warning: no safety cap)", "Replacing mold (Caution: hand is in danger zone)", and so on. The worker status data L1 may also include information relating to advice and instructions issued to the worker. Advice and instructions issued to a worker in an injection molding factory, for example, include "Screw maintenance (Warning: no safety cap. Instruction: put on safety cap)", "Replacing mold (Caution: hand is in danger zone. Advice: Do not place hand in danger zone)", and so on. The worker status data L1 may be acquired by, for example, acquiring in advance an image of the worker while working in the factory and data indicating the state of the manufacturing machine 70 at that time, storing the acquired image and data in the nonvolatile memory 14 or the like, showing the image to the manager, and prompting the manager to input the current status of the worker into the input device 40. The label data acquisition unit 108 is used during learning by the learning unit 110, and after learning by the learning unit 110 is complete, the label data acquisition unit 108 is no longer an essential component of the machine learning device 100.

The learning unit 110 learns the label data L (the worker status data L1 indicating the current status of the worker) with respect to the state variables S (the worker external state data S1 indicating the external state of the worker and the manufacturing machine state data S2 indicating the state of the manufacturing machine 70) in accordance with a given learning algorithm referred to generically as machine learning. The learning unit 110 can learn the correlation between the worker status data L1 included in the label data L and the worker external state data S1 and manufacturing machine state data S2 included in the state variables S, for example. The learning unit 110 can execute learning iteratively on the basis of a data set including the state variables S and the label data L.

During learning by the learning unit 110, a plurality of learning cycles are preferably executed on the basis of data obtained respectively from the situations in which a plurality of workers are working. By implementing these learning cycles repeatedly, the learning unit 110 automatically interprets the correlations between the current statuses of the workers (the worker status data L1) on the one hand and the external states of the workers (the worker external state data S1) and the states of the manufacturing machines 70 (the manufacturing machine state data S2) on the other. At the start of the learning algorithm, the correlation between the worker status data L1 and the worker external state data S1 and manufacturing machine state data S2 is substantially unknown, but the learning unit 110 gradually interprets the relationship between the worker status data L1 and the worker external state data S1 and manufacturing machine state data S2 while advancing the learning process, and using a learned model acquired as a result, the learning unit 110 can interpret the correlation between the worker status data L1 and the worker external state data S1 and manufacturing machine state data S2.

The estimation result output unit 122 estimates the worker status of each worker from the external state of the worker and the state of the manufacturing machine 70 on the basis of the learning result (the learned model) acquired by the learning unit 110, and outputs the estimated worker status of the worker.

Figure 3:
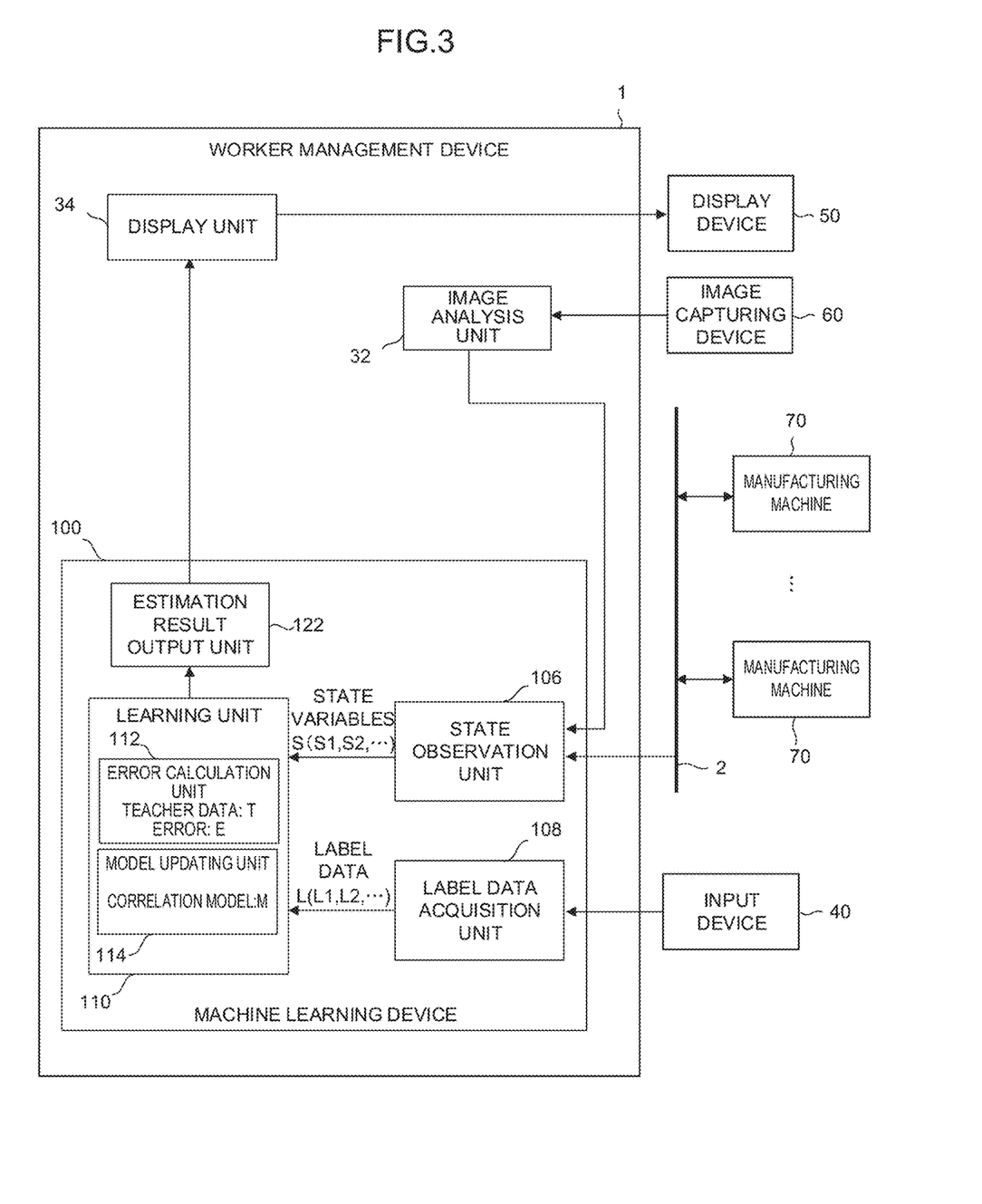
FIG. 3 is a schematic function block diagram showing an embodiment of the worker management device.

In the machine learning device 100 configured as described above, there are no particular limitations on the learning algorithm executed by the learning unit 110, and a learning algorithm that is well-known in the field of machine learning may be employed. FIG. 3 shows another embodiment of the worker management device 1 of FIG. 2, in which, as another example of the learning algorithm, the learning unit 110 executes supervised learning. Supervised learning is a method in which a known data set (referred to as teacher data) including an input and a corresponding output is applied, and by identifying a feature that infers a correlation between the input and the output from the teacher data, a correlation model for estimating a required output relative to a new input is learned.

In the machine learning device 100 of the worker management device 1 shown in FIG. 3, the learning unit 110 includes an error calculation unit 112 that calculates an error E between a correlation model M used to estimate the worker status of the worker from the external state of the worker and the state of the manufacturing machine 70, which are acquired from the manufacturing machine 70, and a correlation feature identified from teacher data T acquired from the external state of the worker and the state of the manufacturing machine 70 in the past and the current status of the worker, as input by the manager, and also includes a model updating unit 114 that updates the correlation model M so as to reduce the error E. By having the model updating unit 114 update the correlation model M repeatedly, the learning unit 110 learns an estimate of the worker status of the worker from the external state of the worker and the state of the manufacturing machine 70.

An initial value of the correlation model M is expressed as a simplification (a linear function, for example) of the correlation between the state variables S and the label data L, for example, and is applied to the learning unit 110 before the start of supervised learning. In the present invention, as described above, the external state of the worker and the state of the manufacturing machine 70 in the past and the worker status of the worker can be used as the teacher data T, and the teacher data T are applied to the learning unit 110 during an operation of the worker management device 1. The error calculation unit 112 uses the teacher data T applied as needed to the learning unit 110 to identify a correlation feature inferring the correlation between the worker status of the worker on the one hand and the external state of the worker and the state of the manufacturing machine 70 on the other, and determines the error E between the correlation feature and the correlation model M corresponding to the state variables S and the label data L in the current state. The model updating unit 114 updates the correlation model M in a direction for reducing the error E in accordance with a predetermined updating rule, for example.

In the next learning cycle, the error calculation unit 112 estimates the worker status of the worker using the state variables S in accordance with the updated correlation model M and determines the error E between the estimation result and the actually acquired label data L, whereupon the model updating unit 114 updates the correlation model M again. As a result, the previously unknown correlation between the current state of the environment and the estimate relating thereto is gradually clarified.

Figure 4A:
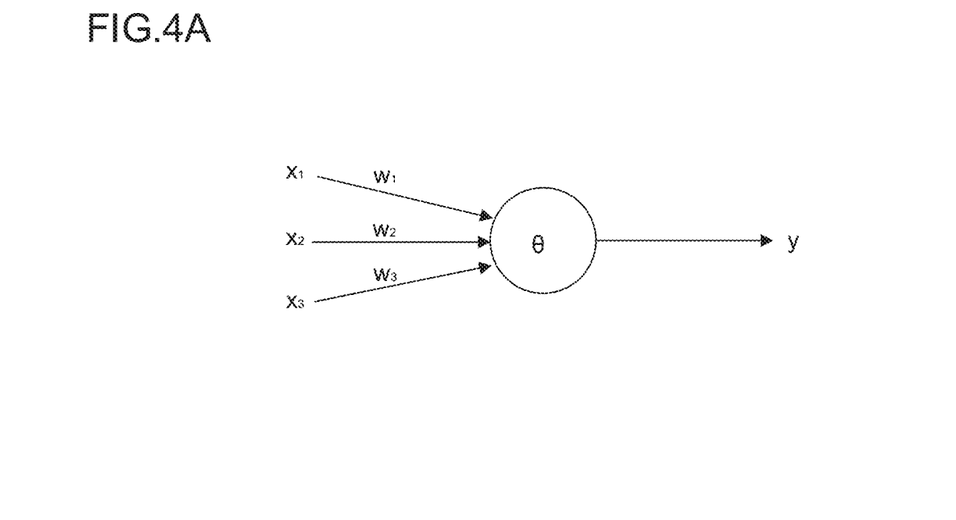
FIG. 4A is a view illustrating a neuron.
Figure 4B:
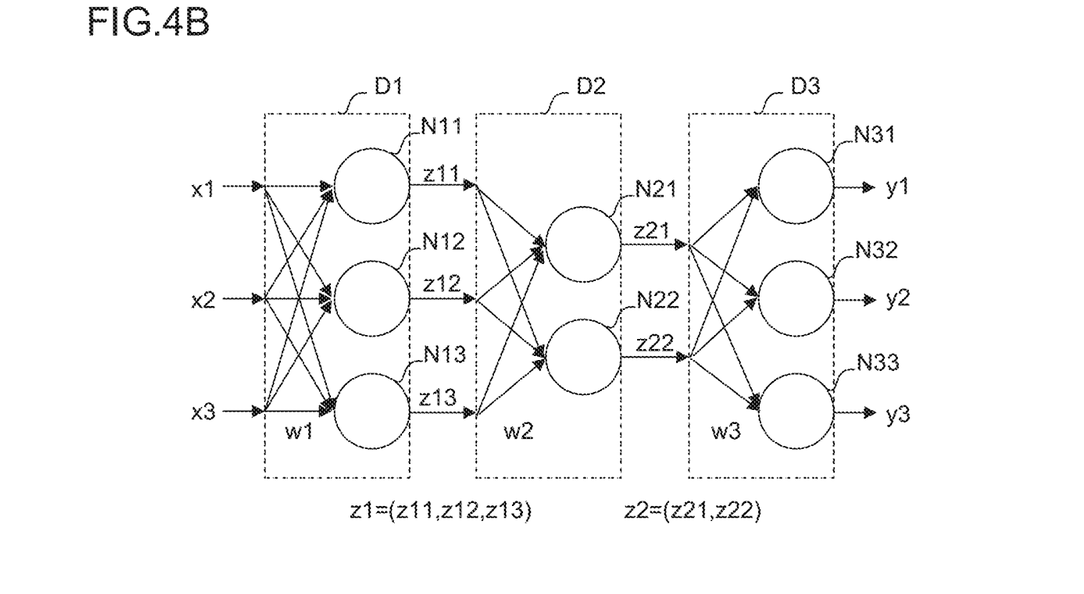
FIG. 4B is a view illustrating a neural network.

To advance the supervised learning process described above, a neural network can be used. FIG. 4A is a pattern diagram showing a model of a neuron, and FIG. 4B is a pattern diagram showing a model of a three-layer neural network formed by combining a plurality of the neurons shown in FIG. 4A. A neural network can be constructed using calculation devices, storage devices, or the like imitating a model of a neuron, for example.

The neuron shown in FIG. 4A outputs a result y in response to a plurality of inputs x (here, for example, an input $x_1$ to $x_3$). Each of the inputs $x_1$ to $x_3$ is multiplied by a corresponding weight w ($w_1$ to $w_3$). As a result, the neuron outputs the result y in the form shown below in formula (1). Note that in formula (1), the input x, the result y, and the weight w are all vectors. Further, θ denotes a bias and $f_k$ denotes an activation function.

$$y \times f_k(\Sigma_{i=1}^n x_i w_i - \theta) \tag{1}$$

In the three-layer neural network shown in FIG. 4B, a plurality of inputs x (here, for example, inputs x1, x2, x3) are input from the left side and results y (here, for example, results y1, y2, y3) are output from the right side. In the example in the figure, the inputs x1, x2, x3 are respectively multiplied by corresponding weights (expressed collectively as w1) so that the individual inputs x1, x2, x3 are all input into three neurons N11, N12, N13.

The respective outputs of the neurons N11 to N13 are expressed collectively as z1. The outputs z1 can each be seen as a feature vector acquired by extracting a feature amount of the corresponding input vector. In the example in FIG. 4B, the feature vectors z1 are respectively multiplied by corresponding weights (expressed collectively as w2) so that the individual feature vectors z1 are all input into two neurons N21, N22. The feature vectors z1 express features between the weight w1 and the weight w2.

The respective outputs of the neurons N21 and N22 are expressed collectively as z2. The outputs z2 can each be seen as a feature vector acquired by extracting a feature amount of the corresponding feature vector z1. In the example in FIG. 4B, the feature vectors z2 are respectively multiplied by corresponding weights (expressed collectively as w3) so that the individual feature vectors z2 are all input into three neurons N31, N32, N33. The feature vectors z2 express features between the weight w2 and the weight w3. Finally, the neurons N31 to N33 respectively output the results y1 to y3.

Note that a so-called deep learning method employing a neural network formed from three or more layers may also be used.

In the machine learning device 100 provided in the worker management device 1, the current status of the worker (the result y) can be estimated from a value (the input x) representing the external state of the worker and the state of the manufacturing machine 70 by having the learning unit 110 perform a multilayer-structure calculation corresponding to the neural network described above using the state variables S as the input x. Note that the neural network includes a learning mode and a value prediction mode as operating modes. For example, in the learning mode, the weight w is learned using a learning data set, and in the value prediction mode, the value of an action can be determined using the learned weight w. Moreover, in the value prediction mode, detection, classification, reasoning, and so on can also be performed.

The configuration of the machine learning device 100 described above may be described as a machine learning method (or software) executed by the processor 101. This machine learning method is a machine learning method for learning an estimate of the current status of the worker from the external state of the worker and the state of the manufacturing machine 70, in which the processor 101 executes a step for observing the external state of the worker (the worker external state data S1) and the state of the manufacturing machine 70 (the manufacturing machine state data S2) as the state variables S representing the current state, a step for acquiring the current status of the worker (the worker status data L1) as the label data L, and a step for learning the current status of the worker in association with the worker external state data S1 and the manufacturing machine state data S2 using the state variables S and the label data L.

The learned model which has been learned by the learning unit 110 of the machine learning device 100 during learning can be used as a program module serving as a part of the machine learning-related software. The learned model according to the present invention can be used in a computer having a processor such as a CPU or a GPU and a memory. More specifically, in response to a command from the learned model stored in the memory, the processor of the computer operates so as to perform a calculation using the external state of the worker and the state of the manufacturing machine 70 as input and output an estimation result of the current status of the worker on the basis of the calculation result. The learned model according to the present invention may be copied to another computer via an external storage medium, a network, or the like, and used thereby.

Moreover, when the learned model of the present invention is copied to another computer and used in a new environment, further learning can be performed on the learned model on the basis of new state variables and label data acquired in the new environment. In this case, a learned model (referred to hereafter as a derived model) corresponding to the new environment can be derived from the learned model. The derived model according to the present invention is identical to the original learned model in that an estimation result of the current status of the worker is output from the external state of the worker and the state of the manufacturing machine 70, but differs therefrom in that a result conforming more closely to the new environment than the original learned model is output. The derived model can also be copied to another computer via an external storage medium, a network, or the like, and used thereby.

Furthermore, a learned model (referred to hereafter as a distilled model) acquired by performing learning from scratch in another machine learning device using output acquired in relation to input into a machine learning device installed with the learned model of the present invention can also be created and used (this learning process is known as distillation). In distillation, the original learned model is known as a teacher model and the newly created distilled model is known as a student model. The distilled model is typically smaller in size than the original learned model even though an equal degree of accuracy to the original learned model is achieved therewith. The distilled model is therefore suitable for distribution to another computer via an external storage medium, a network, or the like.

Figure 5:
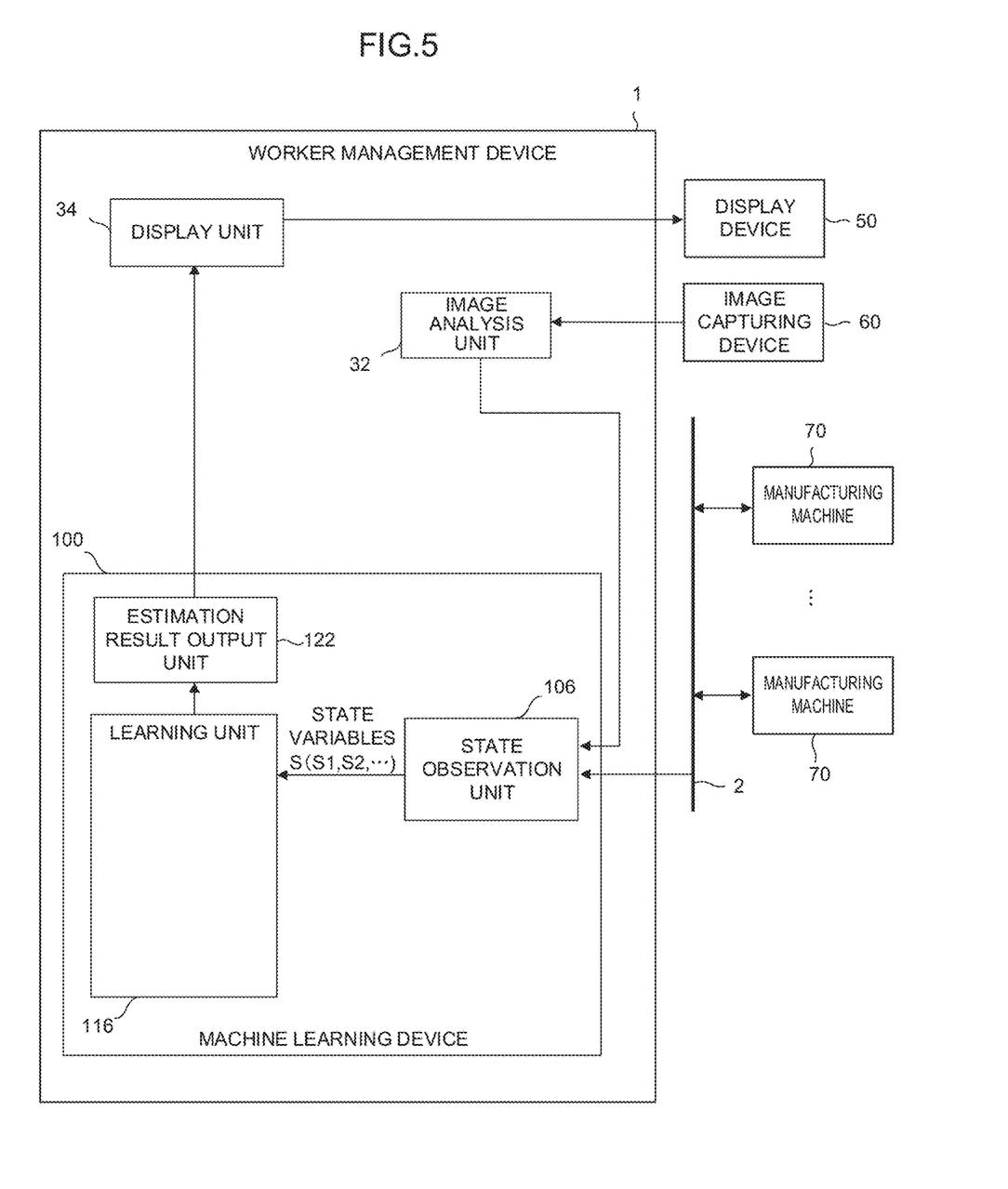
FIG. 5 is a schematic function block diagram showing a worker management device according to a second embodiment.

FIG. 5 is a schematic function block diagram showing the worker management device 1 and the machine learning device 100 according to a second embodiment of the present invention.

In the worker management device 1 and the machine learning device 100 according to the first embodiment, the status information indicating the work being performed by the worker is learned/estimated on the basis of the state variables acquired from the image data showing the worker at work and the data acquired from the manufacturing machine. In the worker management device 1 and the machine learning device 100 according to this embodiment, on the other hand, a worker status indicating an experience level of the worker, a physical condition of the worker, and so on is learned/estimated on the basis of the state variables acquired from the image data showing the worker at work and the data acquired from the manufacturing machine.

Respective function blocks shown in FIG. 5 are realized by having the CPU 11 of the worker management device 1 and the processor 101 of the machine learning device 100, as shown in FIG. 1, respectively execute system programs in order to control operations of the respective parts of the worker management device 1 and the machine learning device 100.

The worker management device 1 according to this embodiment includes the image analysis unit 32 for analyzing images acquired from the image capturing device 60 and generating data to be used during learning by the machine learning device 100, and the display unit 34 for displaying instructions output from the machine learning device 100 to the workers on the display device 50. The functions of the image analysis unit 32 and the display unit 34 are identical to those described in the first embodiment.

Meanwhile, the machine learning device 100 provided in the worker management device 1 includes software (a learning algorithm and so on) and hardware (the processor 101 and so on) for self-learning, through so-called machine learning, an estimate of the worker status of each worker in relation to the external state of the worker and the state of the manufacturing machine. The items learned by the machine learning device 100 of the worker management device 1 correspond to a model structure expressing the correlation between the worker status of the worker on the one hand and the external state of the worker and the state of the manufacturing machine on the other. The machine learning device 100 according to this embodiment differs from the first embodiment in that the experience level of the worker, the physical condition of the worker, and so on are learned as the worker status.

As illustrated by the function blocks shown in FIG. 5, the machine learning device 100 of the worker management device 1 includes the state observation unit 106 for observing, as the state variables S representing the current state of the environment, the worker external state data S1 indicating the external state of the worker and the manufacturing machine state data S2 indicating the state of the manufacturing machine, a learning unit 116 that uses the state variables S to learn the current status of the worker on the basis of the external state of the worker and the state of the manufacturing machine, and the estimation result output unit 122 for outputting the current status of the worker, estimated from the external state of the worker and the state of the manufacturing machine using the learned model learned by the learning unit 116.

The state observation unit 106 acquires the worker external state data S1 and manufacturing machine state data S2 serving as the state variables S from the image analysis unit 32 and the manufacturing machine 70 during learning by the learning unit 116. Further, the state observation unit 106 acquires the worker external state data S1 and manufacturing machine state data S2 serving as the state variables S from the image analysis unit 32 and the manufacturing machine 70 during estimation of the worker status of the worker using the learning result of the learning unit 110.

Of the state variables S observed by the state observation unit 106, the worker external state data S1 can be acquired as a set of data indicating states of the worker that can be specified by external observation, for example. Examples of data indicating states of the worker that can be specified by external observation include data indicating the equipment wearing state of the worker, data indicating the position of the worker (the manufacturing machine 70 near which the worker is working and so on), data indicating external actions by the worker (the manner in which the worker is acting, the manner in which the hands of the worker are outstretched, positional relationships of the hands, head, and torso relative to the manufacturing machine 70, the length of time the hands, head, and torso are held still, and so on), the time spent by the worker on an external action, the operating history of the worker in relation to the manufacturing machine 70, the time of the observation, and so on. Any data that are useful for specifying the work being performed by the worker through external observation may be employed as the worker external state data S1. The data included in the worker external state data S1, indicating the state of the worker, may be constituted by either single numerical values or series of values obtained by sampling values that vary over a predetermined period of time at predetermined period intervals, for example.

The manufacturing machine state data S2 of the state variables S can be acquired from each manufacturing machine 70 as a set of data indicating the state of the manufacturing machine 70. The manufacturing machine state data S2 include, for example, data indicating the operating state of the manufacturing machine 70, data indicating the current state of a movable part of the manufacturing machine 70 (whether a mold is open or the like), machining conditions set in the manufacturing machine 70 and modification histories thereof, data indicating physical quantities of the operation performed by the manufacturing machine 70, an alarm history, product inspection data, a time from sounding to silencing of the alarm, the time spent on each process, the observation time, and so on. Any data relating to the state of the manufacturing machine 70 may be employed as the manufacturing machine state data S2. The data included in the manufacturing machine state data S2, indicating the state of the manufacturing machine 70, may be single numerical values or series of values obtained by sampling values that vary over a predetermined period of time at predetermined period intervals, for example.

The learning unit 116 learns a set of the state variables S (the worker external state data S1 indicating the external state of the worker and the manufacturing machine state data S2 indicating the state of the manufacturing machine 70) in a normal work state by so-called unsupervised learning based on the state variables S in accordance with a given learning algorithm referred to generically as machine learning. The learning unit 116 can learn a cluster created on the basis of the worker external state data S1 and manufacturing machine state data S2 included in the state variables S, for example. The learning unit 116 can execute learning iteratively on the basis of a data set including the state variables S.

During learning by the learning unit 116, a plurality of learning cycles are preferably executed on the basis of data obtained respectively from the situations in which a plurality of workers are working. For example, when the worker external state data S1 indicating the external state of the worker and the manufacturing machine state data S2 indicating the state of the manufacturing machine 70, which are acquired by observing the work situations of the workers under predetermined conditions, have been observed in a predetermined number (a sufficient amount of data for cluster analysis), a learned model (a cluster group) based on the observed worker external state data S1 and manufacturing machine state data S2 is constructed (learned). As the learned model constructed by the learning unit 116, a single learned model may be constructed with respect to workers performing general work, or a learned model may be constructed for each worker using the state variables of the relevant worker in a normal work state, for example. Further, a different learned model may be constructed for each type of work performed by the workers (purging, screw maintenance, and so on), or the workers may be divided according to physical condition and experience level, and a different learned model may be constructed for each physical condition and experience level. Note that well-known hierarchical clustering, non-hierarchical clustering, and so on, for example, may be used as the learning algorithm of the unsupervised learning.

The estimation result output unit 122 estimates the worker status of each worker from the external state of the worker and the state of the manufacturing machine 70 on the basis of the learning result (the learned model) acquired by the learning unit 116, and outputs the estimated worker status of the worker. For example, the estimation result output unit 122 may determine the learned model (cluster) learned by the learning unit 116 to which the observed external state of the worker and state of the manufacturing machine 70 belong, and estimate the worker status in accordance with the result. For example, in a case where a learned model is constructed using the state variables in the normal work state of the worker whose worker status is to be estimated, it is estimated that the physical condition or the like of the worker may be poor when the distance between the state variables acquired by observing the same worker and the state variables in the normal work state of the worker is so large that the observed state variables are determined not to belong to the learned model. Further, in a case where a different learned model is constructed for each experience level, the experience level of a worker can be estimated by determining the learned model to which the state variables acquired by observing the worker belong.

Figure 6:
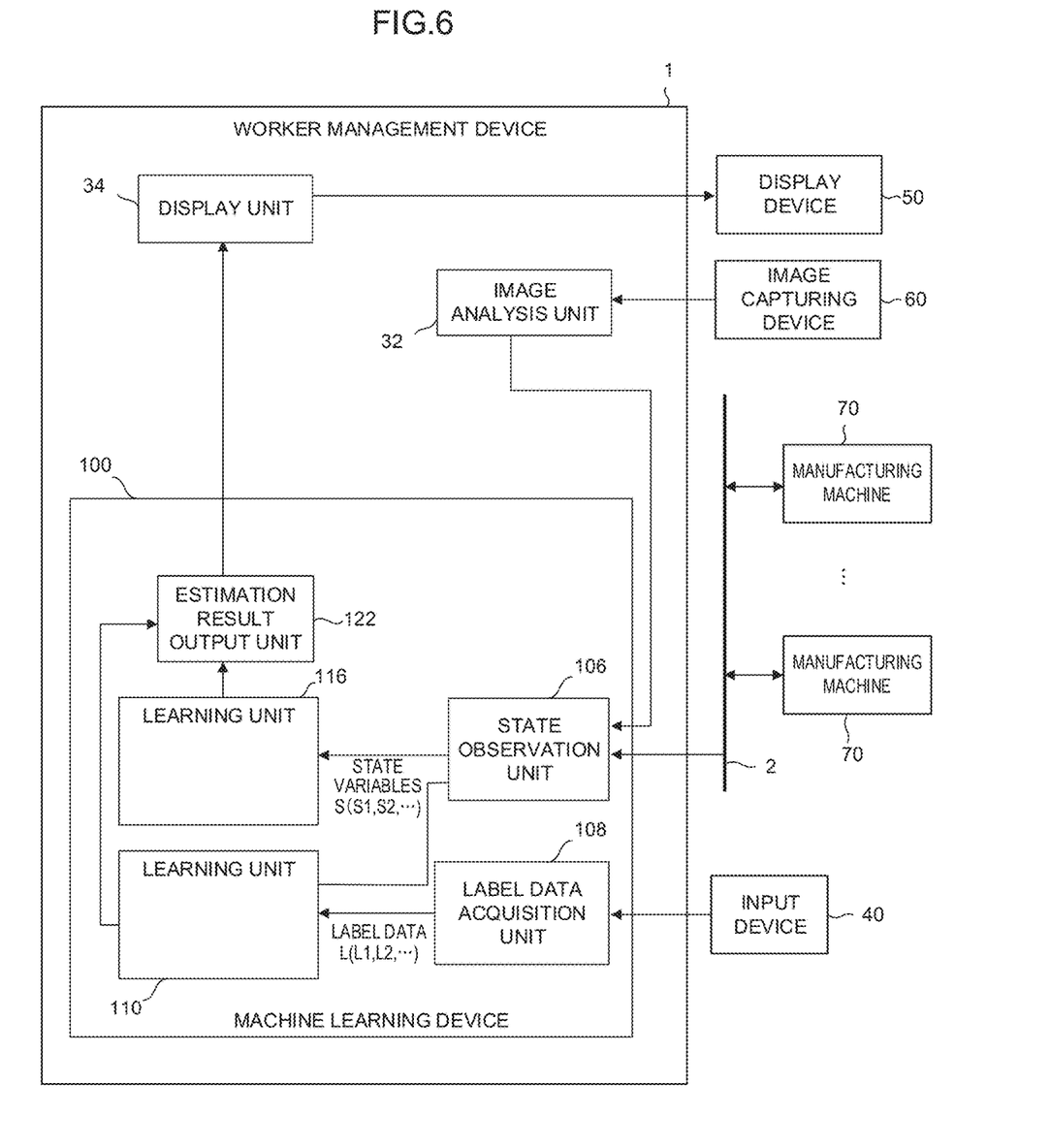
FIG. 6 is a schematic function block diagram showing a worker management device according to a third embodiment.

FIG. 6 is a schematic function block diagram showing the worker management device 1 and the machine learning device 100 according to a third embodiment of the present invention.

The worker management device 1 and the machine learning device 100 according to this embodiment include the learning unit 110 of the machine learning device 100 according to the first embodiment and the learning unit 116 of the machine learning device 100 according to the second embodiment, and an overall worker status is learned/estimated on the basis of the respective outputs thereof. Respective function blocks shown in FIG. 6 are realized by having the CPU 11 of the worker management device 1 and the processor 101 of the machine learning device 100, as shown in FIG. 1, respectively execute system programs in order to control operations of the respective parts of the worker management device 1 and the machine learning device 100.

Apart from the estimation result output unit 122, the worker management device 1 and the machine learning device 100 according to this embodiment are configured identically to those of the first and second embodiments.

The estimation result output unit 122 according to this embodiment estimates the current overall worker status of each worker using the learned model learned by the first learning unit 110 and the learned model learned by the second learning unit 116. The estimation result output unit 122 may create the overall worker status by adding additional information to the estimation result of the worker status including the work situation of the worker, estimated on the basis of the first learning unit 110, in accordance with the worker status including the physical condition and experience level of the worker, estimated on the basis of the second learning unit 116. For example, when it is estimated on the basis of the second learning unit 116 that the experience level of the worker is low and estimated on the basis of the first learning unit 110 that the worker is performing screw maintenance without wearing equipment, the estimation result output unit 122 may add information to the estimation result indicating that the worker requires training.

Embodiments of the present invention were described above, but the present invention is not limited only to the exemplary embodiments described above and may be implemented in various other embodiments by applying appropriate modifications thereto.

For example, the learning algorithm and calculation algorithm executed by the machine learning device 100, the algorithm executed by the worker management device 1, and so on are not limited to the above examples, and various other algorithms may be employed.

Further, in the above embodiments, the worker management device 1 and the machine learning device 100 are described as devices having different CPUs, but the machine learning device 100 may be realized by the CPU 11 of the worker management device 1 and the system program stored in the ROM 12.

The invention claimed is:

1. A worker management device for managing a worker performing work on a manufacturing machine in a factory, the worker management device comprising:
   a machine learning device configured to learn an estimate of a status of the worker in relation to an external state of the worker and a state of the manufacturing machine, the machine learning device including:
   a neural network,
   a state observation unit configured to observe, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively,
   a label data acquisition unit configured to acquire, as label data, worker status data indicating the status of the worker, and
   a learning unit configured to
       perform a multilayer-structure calculation corresponding to the neural network using the state variables and the label data, and
       learn the status of the worker in relation to the external state of the worker and the state of the manufacturing machine by machine learning using at least the state variables and the label data, wherein
   the worker status data include information relating to advice and instruction related to the manufacturing machine.

2. The worker management device according to claim 1, wherein
   the learning unit includes:
   an error calculation unit configured to calculate an error between a correlation model used to estimate a current status of the worker from the state variables and a correlation feature identified from teacher data prepared in advance, and
   a model updating unit configured to update the correlation model so as to reduce the error.

3. The worker management device according to claim 1, wherein the learning unit includes:
   a first learning unit configured to learn the worker external state data and the manufacturing machine state data in association with the worker status data by supervised learning using the state variables and the label data, and
   a second learning unit configured to learn the status of the worker by unsupervised learning using the state variables.

4. The worker management device according to claim 1, wherein the data acquired from the manufacturing machine includes data indicating an operating state of the manufacturing machine, a current state of a movable part of the manufacturing machine, or machining conditions set in the manufacturing machine and modification histories.

5. The worker management device according to claim 1, wherein the data acquired from the manufacturing machine includes data indicating physical quantities of an operation performed by the manufacturing machine, an alarm history, product inspection data, or an observation time.

6. A worker management device for managing a worker performing work on a manufacturing machine in a factory, the worker management device comprising:
a machine learning device that has learned an estimate of a status of the worker in relation to an external state of the worker and a state of the manufacturing machine, the machine learning device including:
a neural network,
a state observation unit configured to observe, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively,
a label data acquisition unit configured to acquire, as label data, worker status data indicating the status of the worker,
a learning unit that has
performed a multilayer-structure calculation corresponding to the neural network using the state variables and the label data, and
learned, through machine learning, the status of the worker in association with the external state of the worker and the state of the manufacturing machine using at least the state variables and the label data, and
an estimation result output unit configured to output the estimate of the status of the worker on the basis of the state variables observed by the state observation unit and a learning result acquired by the learning unit, wherein
the worker status data include information relating to advice and instruction related to the manufacturing machine.

7. The worker management device according to claim 6, wherein
the learning unit includes:
a first learning unit that has learned, through supervised learning, the external state of the worker and the state of the manufacturing machine in association with the status of the worker, and
a second learning unit that has learned, through unsupervised learning, the status of the worker based on the external state of the worker and the state of the manufacturing machine, and
the estimation result output unit is configured to output the estimate of the status of the worker on the basis of the state variables observed by the state observation unit, a learning result acquired by the first learning unit, and a learning result acquired by the second learning unit.

8. The worker management device according to claim 6, wherein the data acquired from the manufacturing machine includes data indicating an operating state of the manufacturing machine, a current state of a movable part of the manufacturing machine, or machining conditions set in the manufacturing machine and modification histories.

9. The worker management device according to claim 6, wherein the data acquired from the manufacturing machine includes data indicating physical quantities of an operation performed by the manufacturing machine, an alarm history, product inspection data, or an observation time.

10. A machine learning device for learning an estimate of a status of a worker performing work on a manufacturing machine in a factory in relation to an external state of the worker and a state of the manufacturing machine, the machine learning device comprising:
a neural network;
a state observation unit configured to observe, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively;
a label data acquisition unit configured to acquire, as label data, worker status data indicating the status of the worker; and
a learning unit configured to
perform a multilayer-structure calculation corresponding to the neural network using the state variables and the label data, and
learn the status of the worker in relation to the external state of the worker and the state of the manufacturing machine by machine learning using at least the state variables and the label data, wherein
the worker status data include information relating to advice and instruction related to the manufacturing machine.

11. The machine learning device according to claim 10, wherein the learning unit includes:
a first learning unit configured to learn the worker external state data and the manufacturing machine state data in association with the worker status data by supervised learning using the state variables and the label data, and
a second learning unit configured to learn the status of the worker by unsupervised learning using the state variables.

12. The machine learning device according to claim 10, wherein the data acquired from the manufacturing machine includes data indicating an operating state of the manufacturing machine, a current state of a movable part of the manufacturing machine, or machining conditions set in the manufacturing machine and modification histories.

13. The machine learning device according to claim 10, wherein the data acquired from the manufacturing machine includes data indicating physical quantities of an operation performed by the manufacturing machine, an alarm history, product inspection data, or an observation time.

14. A machine learning device that has learned an estimate of a status of a worker performing work on a manufacturing machine in a factory in relation to an external state of the worker and a state of the manufacturing machine, the machine learning device comprising:
a neural network;
a state observation unit configured to observe, as state variables representing a current state of an environment, worker external state data indicating the external state of the worker, and manufacturing machine state data indicating the state of the manufacturing machine on the basis of image data acquired by photographing a work situation of the worker, and data acquired from the manufacturing machine, respectively;

a label data acquisition unit configured to acquire, as label data, worker status data indicating the status of the worker;

a learning unit that has performed a multilayer-structure calculation corresponding to the neural network using the state variables and the label data, and learned, through machine learning, the status of the worker in association with the external state of the worker and the state of the manufacturing machine using at least the state variables and the label data; and an estimation result output unit configured to output the estimate of the status of the worker on the basis of the state variables observed by the state observation unit and a learning result acquired by the learning unit, wherein the worker status data include information relating to advice and instruction related to the manufacturing machine.

15. The machine learning device according to claim 14, wherein the learning unit includes:

a first learning unit that has learned, through supervised learning, the external state of the worker and the state of the manufacturing machine in association with the status of the worker, and a second learning unit that has learned, through unsupervised learning, the status of the worker based on the external state of the worker and the state of the manufacturing machine; and the estimation result output unit is configured to output the estimate of the status of the worker on the basis of the state variables observed by the state observation unit, a learning result acquired by the first learning unit, and a learning result acquired by the second learning unit.

16. The machine learning device according to claim 14, wherein the data acquired from the manufacturing machine includes data indicating an operating state of the manufacturing machine, a current state of a movable part of the manufacturing machine, or machining conditions set in the manufacturing machine and modification histories.

17. The machine learning device according to claim 14, wherein the data acquired from the manufacturing machine includes data indicating physical quantities of an operation performed by the manufacturing machine, an alarm history, product inspection data, or an observation time.

* * * * *